Feb. 25, 1930.  F. S. HYDE  1,748,483
BEVERAGE MIXER
Filed Jan. 23, 1928
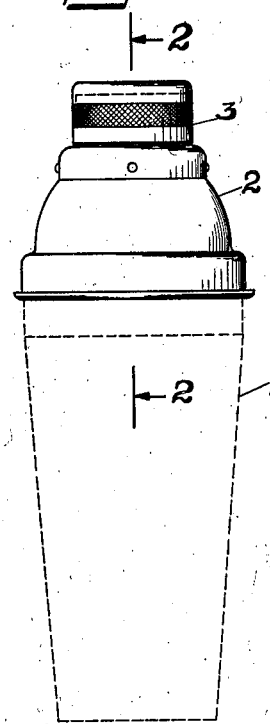
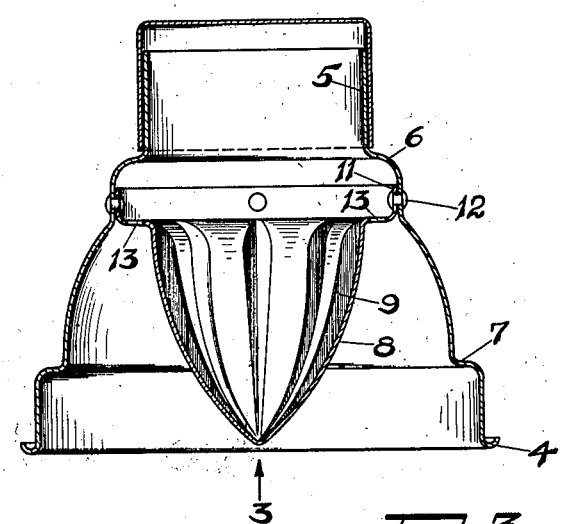
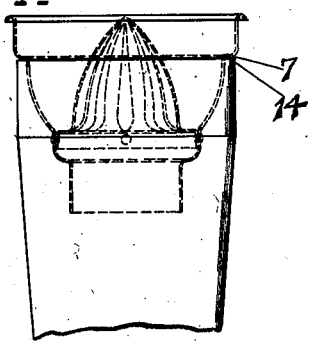
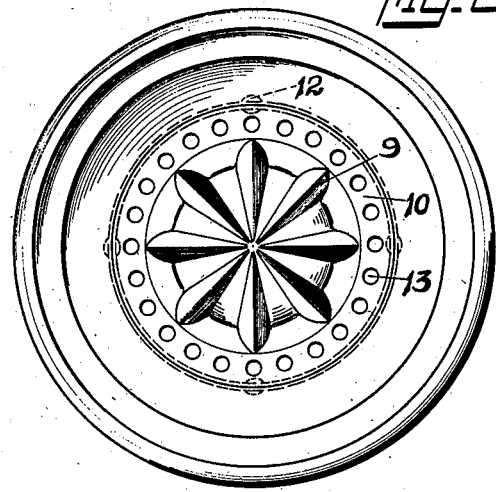
Inventor
Francis Stillman Hyde
By his Attorneys Patented Feb. 25, 1930

1,748,483

UNITED STATES PATENT OFFICE

FRANCIS STILLMAN HYDE, OF WATERBURY, CONNECTICUT, ASSIGNOR TO SCOVILL MANUFACTURING COMPANY, OF WATERBURY, CONNECTICUT, A CORPORATION OF CONNECTICUT

BEVERAGE MIXER

Application filed January 23, 1928. Serial No. 248,610.

This invention relates to certain improvements in beverage mixers of that class which are used in shaking up or mixing beverages by hand.

It is the especial object of the present invention to provide a shaker of improved construction which will include a squeezer element for squeezing fruit juice, which element is permanently secured to the shaker so that it will not be lost or mislaid, and which is secured in such a way that the use of solder is eliminated, which is undesirable in this class of shaker.

A further object of the invention is to produce a mixer of such design that the contents thereof can be dispensed from the mixer in a steady even stream, so as to avoid undesirable spattering of the contents while being dispensed.

With these and other objects not specifically referred to in view, the invention consists in certain novel parts, arrangements and combinations which will be described in connection with the accompanying drawings and the novel features pointed out in the claims hereunto annexed.

In the drawings,—

Figure 1 is a side elevation of the improved beverage mixer, the container or body of the mixer being shown in dotted lines;

Figure 2 is a sectional view taken on the line 2—2 of Figure 1, on an enlarged scale, showing the improvements of the present invention;

Figure 3 is a bottom view of the construction shown in Figure 2, the view being taken in the direction of arrow 3 of that figure, and Figure 4 is a partial side elevation showing the position of the parts when the mixer is being employed for extracting fruit juice.

Referring now to these drawings, the mixer will include a body 1, of conventional design and of a size to be easily held in the hands, a top 2 and a cover 3. The top 2 is or may be provided with a half round 4 to facilitate its removal from the body 1. This top is also provided with a restricted neck portion 5 forming a dispensing orifice, and below this neck portion the top is enlarged, as indicated at 6, forming a shoulder. Below the shoulder 6, the top is or may be further enlarged, as indicated at 7, so as to provide sufficient room for the fruit when the mixer is being used for extracting fruit juice.

In accordance with the invention, the mixer is provided with a squeezer element, shown in the form of a cone 8, provided with flutes 9 having edges which act to cut up the fruit when the juice is being extracted therefrom. This squeezer element is rigidly and permanently secured in the top in such a manner that the use of solder is eliminated, and is also formed so that when the contents of the mixer are dispensed therefrom such contents will flow in an even regular stream. While the specific construction of the parts for effecting this may be somewhat varied, in the particular construction illustrated the squeezer element 8 is formed with a horizontal flange 10, which flange terminates in a short vertical flange 11. This short vertical flange is secured to the shoulder portion 6 of the top by rivets 12, four such rivets being illustrated. With this construction therefore the squeezer element is permanently held in place without the use of solder and can be assembled in a quick and economical way.

To provide for the dispensing of the contents of the mixer in a steady stream, there are provided a plurality of pouring openings 13, and these openings are located in the horizontal flange 10, before referred to, beyond the flutes and below the shoulder portion of the top. With the openings thus positioned, when the mixer is used for pouring, the contents thereof are directed in a regular even stream through the neck, and spattering is avoided.

In use, where it is desired to extract fruit juice, the cap 3 of the mixer is removed, and the top 2 is removed from the body 1 and inverted and replaced on the body in the position shown in Fig. 4, the shoulder 7 of the top resting on the top edge 14 of the body 1, the extracted juice passing through the openings 13 into the body 1. After the desired beverage has been mixed, the top is reverted to the position shown in Figure 1, the cap 3 replaced, and the mixer shaken or otherwise agitated as desired. When pouring, of course, the top 3 is removed.

The parts of the mixer are all preferably made of light metal, and from the construction shown and described it will be seen that the mixer may be economically produced and assembled.

While the construction has been shown and described in its preferred form, it will be understood that various changes may be made in the construction and arrangement of the parts without departing from the invention as defined in the appended claims.

What I claim is:

1. In a beverage mixer, the combination with a mixer body, of a top therefor having a neck forming a dispensing orifice, a shoulder located below the neck, a squeezer element having an upright peripheral flange, the free edge of which extends toward the pouring neck, riveted to the shoulder portion so as to be rigidly secured thereto, pouring openings in the squeezer element located below the neck, and a removable cap closing the top.

2. In a beverage mixer, the combination with a mixer body, of a top therefor having a restricted open neck forming a dispensing orifice, an enlarged portion below the neck forming a shoulder, a fluted squeezer element having a horizontal flange extending beyond the flutes and terminating in a vertical flange, the free edge of which extends toward the pouring neck riveted to the shoulder portion so as to be rigidly secured thereto, pouring holes in the horizontal flange beyond the flutes, and a removable cap closing the top.

In testimony whereof, I have hereunto set my hand.

FRANCIS STILLMAN HYDE.